May 26, 1959 — R. MEMPEL — 2,888,303
ANTI-FRICTION BEARINGS
Filed Dec. 18, 1957 — 2 Sheets-Sheet 1
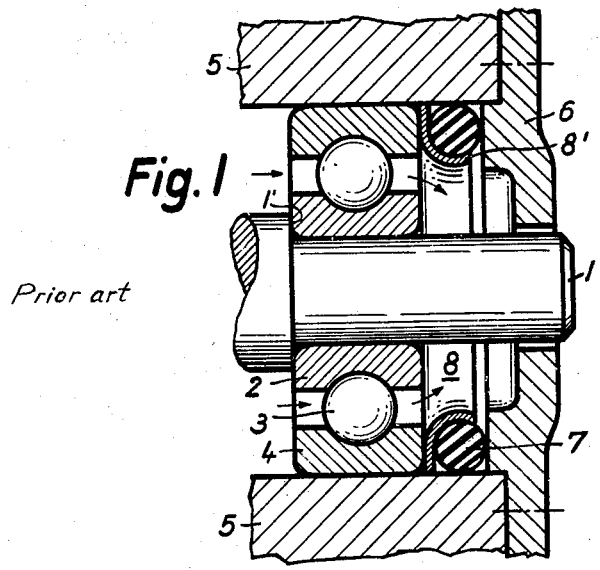
Fig. 1 — Prior art
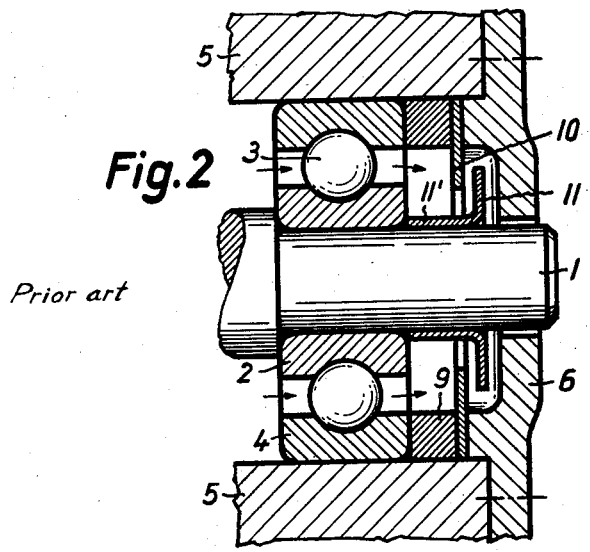
Fig. 2 — Prior art
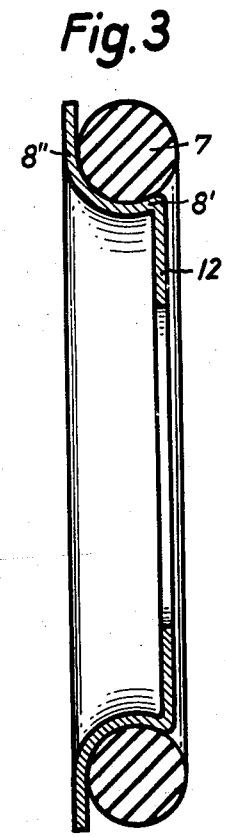
Fig. 3
Inventor:
Rudolf Mempel
By [signature], Patent Agent

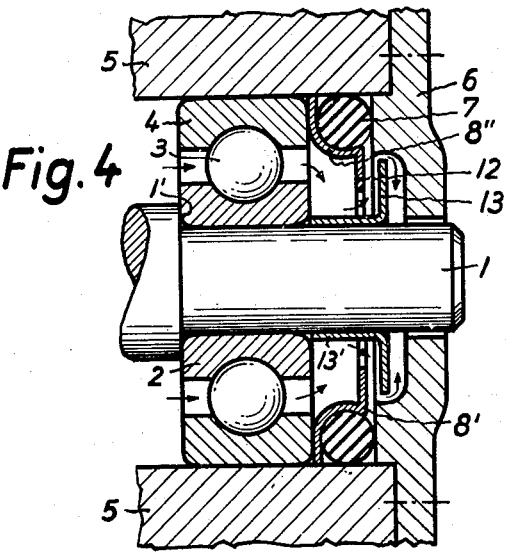
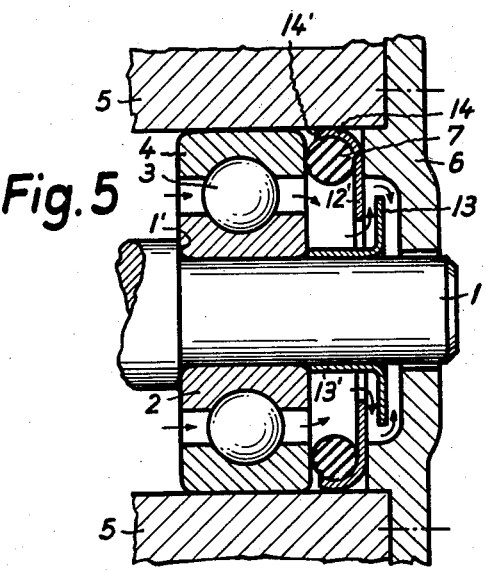

United States Patent Office 2,888,303
Patented May 26, 1959

2,888,303
ANTI-FRICTION BEARINGS

Rudolf Mempel, Berlin-Frohnau, Germany, assignor to Licentia Patent-Verwaltungs-G.m.b.H., Hamburg, Germany Application December 18, 1957, Serial No. 703,633

Claims priority, application Germany December 19, 1956

3 Claims. (Cl. 308—187.1)

The invention relates to anti-friction bearings, such as roller or ball bearings, with means for controlling the amount of lubricant used in these bearings.

It has been taught by U.S. Patent No. 2,803,507 to provide in an assembly of anti-friction bearings, such as ball bearings, rotatably supporting a shaft, means for compensating the axial play of the bearings, said means simultaneously dampening mechanical oscillations or vibrations in the bearings or the shaft. In this known bearing assembly, an elastic spacer ring, for example of rubber, is inserted in the gap between one front end of a stationary frame member supporting the bearing and the outer race ring of the bearing held therein at said end. In addition to this elastic compensating and dampening ring, permitting elastic deformation, an abutment or retaining ring of solid material is provided within the gap between the front end of the frame member and the outer racering. This retaining ring partly surrounds the elastic spacer ring and has an annular flange extending in longitudinal direction and being adapted to limit the extent of displacement of the bearing in longitudinal direction with respect to the frame member, thereby protecting the elastic spacer ring from impermissible compression forces.

It is an object of the present invention to provide this solid retaining ring in such a manner that it will simultaneously control the amount of lubricant or grease used in the anti-friction bearing. As a result of this, the field of utilization of the compensating means for the axial play and its industrial and commercial application are considerably augmented.

It is another object of the invention to provide an annular rim or extension directed toward the shaft on the annular flange of the solid retaining ring, this rim or extension serving as stationary control means for the lubricant or greases.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 shows schematically a longitudinal section through a ball bearing with an elastic compensating spacer ring and a solid retaining ring, according to the mentioned prior art construction.

Figure 2 illustrates schematically a longitudinal section through a ball bearing with means to control the amount of lubricant or grease used in this bearing, according to another prior art design.

Figure 3 is a longitudinal section through an elastic spacer ring and a retainer ring, according to the present invention;

Figure 4 illustrates schematicallly a longitudinal section through a ball bearing according to the invention;

Figure 5 shows schematically a longitudinal section through a modified ball bearing construction according to the invention.

In the prior art ball bearing with elastic compensating means for the axial play, as shown in Figure 1, a shaft 1 is rotatably mounted in a ball bearing comprising an inner race ring 2 and an outer race ring 4 having grooves respectively facing one another and providing internal raceways for a plurality of balls 3 riding therein. The inner race ring 2 is mounted on the shaft 1 close to its right end, an annular shoulder 1' of this shaft engaging an adjacent front surface at the left side of this inner race ring 2. The ball bearing is provided in an opening of a stationary bearing frame 5, which opening is bordered on the right side by a flange member 6. A compensating means comprising a slightly compressed or deformed elastic or resilient spacer ring 7, for example of natural or synthetic resin or rubber, such as known under the name Buna, or of silicon rubber, and a relatively thin retaining ring 8 of solid material are inserted between the inner side wall of the flange member 6 and the opposite side of the outer race 4, said rings filling a gap in the opening of the bearing frame 5. The retaining ring 8 partly surrounds the spacer ring 7 and has an annular flange 8' extending in longitudinal direction of the bearing toward the flange member 6 without engaging the inner side wall of this member 6 under normal conditions. If axial forces acting on the shaft 1 displace the latter and, thereby, the ball bearing to the right, the outer race ring 4 will compress the elastic spacer ring 7, whereby the displacement of the ball bearing is limited by the retaining ring 8, as the outer rim of flange 8' of this ring 8 will engage the inner wall of the flange member 6 when these axial forces exceed a certain value.

Figure 2 shows a prior art ball bearing assembly with a control means for the lubricant but without compensating means for the axial play. The ball bearing, shaft, frame and flange member in Figure 2 are of the same construction as in Figure 1 and, therefore, are denoted by the same reference numerals. However, in Figure 2, a solid spacer ring 9 and a flat solid annular disk or plate 10 are inserted between the outer race ring 4 and the inner wall of the flange member 6. In addition to the inner race ring 2, a disk 11 having a flange 11' is mounted on the shaft 1, i.e., this flange 11' of the disk 11 is secured to the shaft 1 adjacent the inner race ring 2, whereby the disks 10 and 11 are spaced with respect to each other a certain distance in axial direction. If the shaft 1 rotates, the disk 11 will be simultaneously driven and thus forcing under centrifugal action lubricant or grease adhering thereto through the radial gap between the two disks 10 and 11. The used lubricant or grease, thus removed from the anti-friction bearing chamber, can be discharged via an opening not shown in the flange member 6.

In the embodiment of this invention, illustrated in Figure 3, the elastic spacer ring 7 is the same as that in Figure 1, while a retaining ring 8" is modified, i.e., has an annular projection 12 as outer rim of its flange 8'. As shown in the assembled bearing of Figure 4, this annular projection or rim 12 of the ring 8" extends toward the shaft 1. A disk 13 mounted with its flange 13' on the shaft 1 and axially spaced from the annular projection 12 acts as centrifugal member when the shaft 1 rotates in the same way as the disk 11 in Figure 2. Thus, the annular projection 12, together with the disk 13, constitute a means for controlling the lubricant or grease used in the ball bearing assembly of Figure 4.

At the same time, the retaining ring 8″ serves to limit the elastic deformation of the resilient ring 7 in principally the same manner as the retaining ring 8 in Figure 1. In contrast to the flat disk 10 in Figure 2, engaging the inner wall of the flange member 6, the annular projection 12 in Figure 4 is spaced from the inner wall of the flange member 6.

The retaining ring 8″ which, according to the present invention, has a double purpose, can be manufactured inexpensively, for example, from sheet metal, and is not substantially larger than the retaining ring 8 of the prior art design shown in Figure 1, thus, the cost of manufacturing the ring 8″ will not be substantially higher than that of ring 8. In addition to this advantage, the overall length of the anti-friction bearing assembly according to the invention is not increased with respect to that of the bearing assembly with the known lubricant control means according to Figure 2, while a simple combination of the bearing assemblies of Figures 1 and 2 would result in a larger construction in view of the additional space required for the disk 10 of Figure 2, which would have to be added to the ring assembly 7 and 8 of Figure 1.

In the embodiment of Figure 5, a solid retaining ring 14 surrounds the elastic spacer ring 7 from the outside rather than from the inside as in Figure 4. An annular projection or rim 12′ extends towards the shaft 1. This annular projection 12′ constitutes a tangential extension of the ring 14, while in Figure 4, a sharp bend forms the joint between the flange 8′ of the ring 8″ and the projection 12. Due to the simplified structure of the ring 14 with its tangential annular projection 12′, its manufacture is less expensive than that of the ring 8″ of Figure 4. The annular projection 12′ cooperates with the centrifugal disk 13 on the shaft 1 in the same manner as the annular projection 12 with the disk 13 in Figure 4. Thus, the control of the lubricant operates in the same way in Figures 4 and 5.

While in the embodiment of Figure 4 the inner rim of the flange 8′ of the solid ring 8″ at the joint with the projection 12 engages the inner wall of the flange member 6 when excessive axial forces act on the shaft 1, the outer edge 14′ of the solid ring 14 in Figure 5 will engage the right front face of the outer race ring 4, thus protecting the spacer ring 7 from excessive thrust.

I claim:

1. In an anti-friction bearing assembly rotatably supporting a shaft, a stationary frame member having an opening, an anti-friction bearing in said opening, lubricant in said opening, said bearing comprising an inner race secured to said shaft, a outer race mounted in said opening, said races having grooves respectively facing one another and providing an internal raceway, a plurality of rolling means riding in said raceway, means on at least one of the sides of said frame member to hold said outer race in said opening, a resilient spacer ring of deformable, elastic material in said opening partially filling the cross section of an annular gap left therein between one front end of said outer race and said holding means, the material of said spacer ring permitting an elastic deformation thereof under the action of forces exerted on said shaft in longitudinal direction, a retaining ring of solid material inserted between said resilient spacer ring and said front end of said outer race, said retaining ring having an annular flange portion partially surrounding said spacer ring and having an edge forming an abutment in said opening being adapted to limit the displacement of said outer race in longitudinal direction with respect to said frame member when said forces overcome the resistance of compression and deformation of said spacer ring; and a lubricant control means in said opening comprising an annular rim on said flange portion of said retaining ring extending towards the shaft, and a disk mounted on said shaft within said opening opposite of and spaced from said rim a distance providing a relatively narrow radial gap between said rim and said disk through which gap said lubricant will be forced under the centrifugal action of said disk when rotating with said shaft.

2. In an anti-friction bearing according to claim 1, said flange portion of said retaining ring partially surrounding said spacer ring from the inside, said annular rim extending from an edge of said flange portion, which edge is opposite and normally spaced from said holding means, whereby said edge forms said abutment on said retaining ring adapted to engage said holding means when said forces overcome said resistance of said spacer ring.

3. In an anti-friction bearing according to claim 1, said flange portion of said retaining ring partially surrounding said spacer ring from the outside, said annular rim extending from said flange portion tangentially adjacent said holding means, said spacer ring being formed with an edge opposite and normally spaced from said front end of said outer race, whereby said edge forms said abutment on said retaining ring adapted to engage said front end of said outer race when said forces overcome said resistance of said spacer ring.

References Cited in the file of this patent

UNITED STATES PATENTS

| | | |
|---|---|---|
| 1,720,703 | Sunleaf | July 16, 1929 |
| 2,160,220 | Leister | May 30, 1939 |
| 2,803,507 | Mempel et al. | Aug. 20, 1957 |